US006826838B2

(12) United States Patent
Arnold

(10) Patent No.: US 6,826,838 B2
(45) Date of Patent: Dec. 7, 2004

(54) CLIP-ON CORNER ALIGNMENT DEVICE

(75) Inventor: Robert Arnold, Spokane, WA (US)

(73) Assignee: Craftek Products, Inc., Spokane, WA (US)

( * ) Notice: Subject to any disclaimer, the term of this patent is extended or adjusted under 35 U.S.C. 154(b) by 28 days.

(21) Appl. No.: 10/025,832

(22) Filed: Dec. 19, 2001

(65) Prior Publication Data

US 2003/0110917 A1 Jun. 19, 2003

(51) Int. Cl.[7] .................................................. B23Q 16/00

(52) U.S. Cl. .......................... 30/286; 30/289; 83/467.1; 83/441; 33/630

(58) Field of Search .......................... 30/286, 289, 290, 30/294, 358, 363, 364; 83/467.1, 684, 685, 686, 693, 694, 468.6, 468.93, 441; D19/65, 72; D8/98; 269/254 R, 41; 33/430, 533, 645, 628, 630, 528, DIG. 10; 24/456, 570, 571

(56) References Cited

U.S. PATENT DOCUMENTS

| | | | | | |
|---|---|---|---|---|---|
| 70,586 | A | * | 11/1867 | Mansur | 294/99.2 |
| 1,804,648 | A | * | 5/1931 | Scribner | 30/363 |
| 1,928,120 | A | * | 9/1933 | Winton | 30/229 |
| 2,085,079 | A | * | 6/1937 | Broadwell | 30/229 |
| 3,350,781 | A | * | 11/1967 | Bender | 30/358 |
| 4,106,195 | A | * | 8/1978 | Berg | 30/293 |
| RE32,460 | E | * | 7/1987 | Leggett, Jr. | 30/363 |
| D392,323 | S | * | 3/1998 | Appelbaum | D19/72 |
| 5,893,313 | A | * | 4/1999 | Mori | 83/694 |
| D415,529 | S | * | 10/1999 | Mori | D19/72 |
| 6,209,434 | B1 | * | 4/2001 | Kim et al. | 83/549 |
| 6,308,421 | B1 | * | 10/2001 | Wang | 30/178 |
| 6,457,218 | B1 | * | 10/2002 | Lawrence | 24/563 |

FOREIGN PATENT DOCUMENTS

| | | | |
|---|---|---|---|
| GB | 2 302 518 | * | 1/1997 |

* cited by examiner

*Primary Examiner*—Boyer Ashley
*Assistant Examiner*—Thomas J Druan, Jr.
(74) *Attorney, Agent, or Firm*—Sofer & Haroun, LLP

(57) ABSTRACT

The present invention provides for an alignment device for aligning a punch tool to punch a design into a sheet media comprised of a clip, where the clip is comprised of first and second resilient arms meeting at a connection point. A first guide edge is disposed angularly from the first resilient arm, such that when the punch tool is secured in the clip between the first and second resilient arms and the sheet media is placed along the first guide edge, the punch tool is positioned to punch a design into the sheet media. Additionally, a second guide edge may be disposed angularly from the second resilient arm, such that when the punch tool is secured in the clip between the first and second resilient arms and the sheet media is placed along the first and second guide edges, the punch tool is positioned to punch a design into the sheet media.

22 Claims, 7 Drawing Sheets

CLIP-ON CORNER ALIGNMENT DEVICE

FIELD OF THE INVENTION

This invention relates to an alignment device. More specifically, this invention relates to a corner alignment device for use with punching a sheet media with a punch tool.

BACKGROUND OF THE INVENTION

This invention relates to the use of manually operated punch tools such as those commonly referred to as "craft punches," "corner punches" or "corner rounders" to produce decorative or functional holes or edge shapes in the corners or edges of sheet media such as paper or card stock. These punches typically comprise a metal die with a spring loaded metal punch and housing, typically fabricated with plastic, and may include internal guides for the corners of the media being punched.

In the prior art, it is necessary when punching corners to align the corners of the media being punched with the small guides internally disposed within the punch assembly, if so equipped. The guiding edges of the internal guides are not easily visible to the user during use, and it is difficult and time consuming to align the media accurately to the internal guides. Even when the sheet media is carefully aligned, misjudging the material position or movement while punching often occurs resulting in poorly aligned holes or edge shapes. Some punches do not include guides, and they are even more difficult to align accurately. Alternatively, some punch tools maintain external guide edges, however these are fixed in place as part of the punch housing which precludes using the punch without the guides if desired for certain functions.

In addition to the difficulty in using these guide edges, they are either difficult to remove, may break during removal, or are not removable at all. It is sometimes desirable to use the punch tools along the straight edges of the sheet media, however, fixed corner aligning guide edges make it difficult or impossible to properly align the sheet media, resulting in inaccurate punching.

As such, it is the aim of the present invention to overcome these difficulties and provide a means for accurately aligning the media to be punched within the punching slot of the punch tool so as to produce accurately aligned corner or edge punches while providing an alignment guide means that is easily removed and reinstalled.

SUMMARY OF THE INVENTION

The present invention provides for an alignment device for aligning a punch tool to punch a design into a sheet media comprised of a clip, where the clip is comprised of first and second resilient arms meeting at a connection point. A first guide edge is disposed angularly from the first resilient arm and a second guide edge is disposed angularly from the second resilient arm such that when the punch tool is secured in the clip between the first and second resilient arms and the sheet media is placed along the first and second guide edges, the punch tool is positioned to punch a design into the corner of the sheet media.

Alternately, the guide edges may be positioned such as to align the punch to the edge of the sheet media and one or more guide or alignment means may be provided to align the punch relative to a feature on the sheet media such as an indicium, a punched hole, a scored or folded line, or an edge.

Because punch tools are manufactured in many different configurations, the exact form of the invention and how it is affixed to the punch tool may vary to fit the physical characteristics of a particular punch tool design.

DETAILED DESCRIPTION

Figure 1:
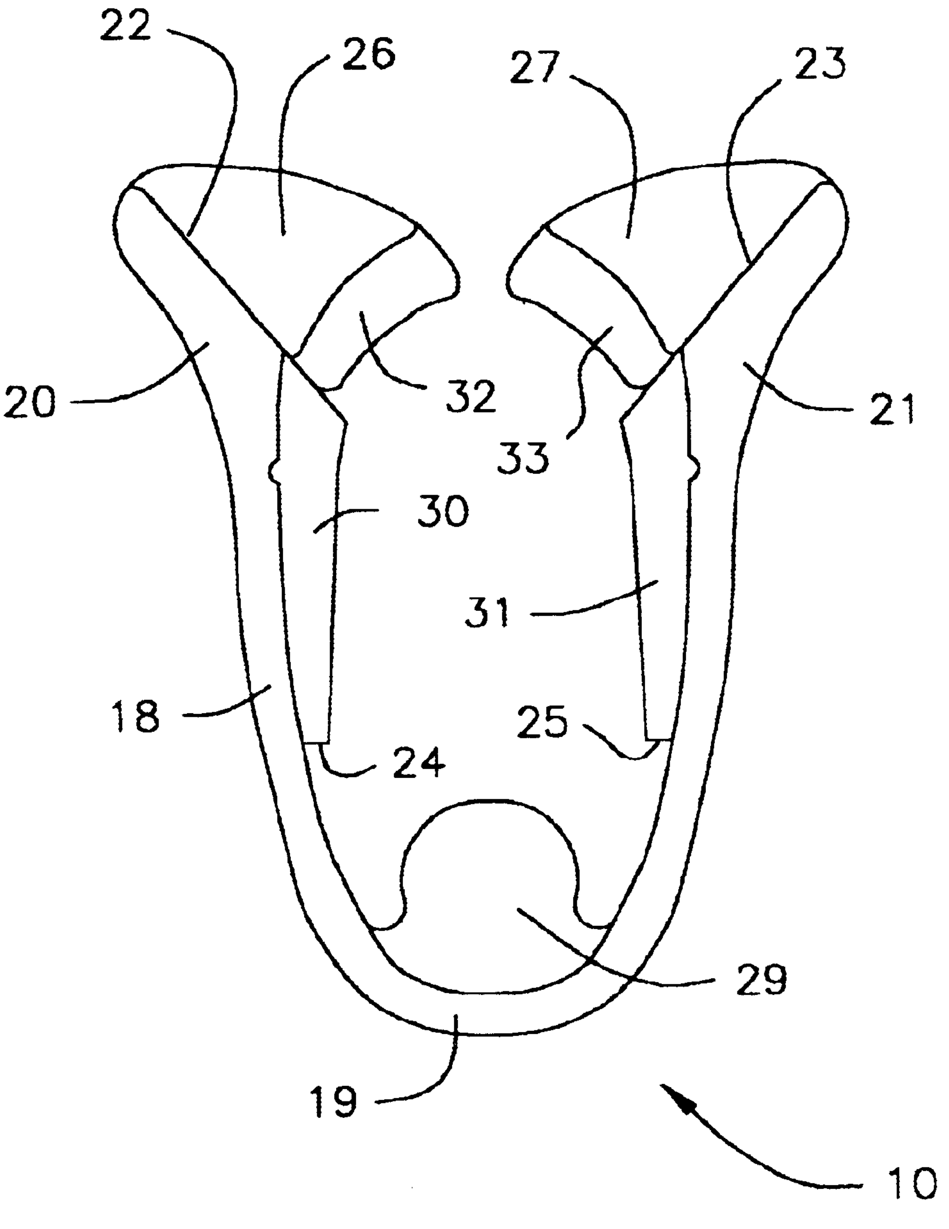
FIG. 1 illustrates a top view of an alignment device, in accordance with one embodiment of the present invention.

In one embodiment of the present invention, as illustrated in FIG. 1, an alignment device 10 is configured to provide a means for accurately aligning a sheet media 14 within a punch tool 12 so as to facilitate the use of punch tool 12 in punching a design 16 into sheet media 14.

Figure 2A:
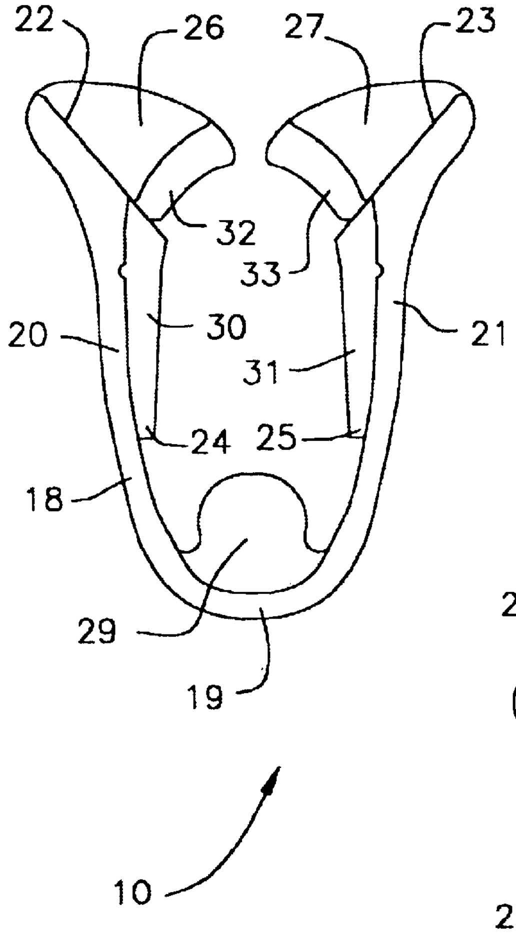
FIGS. 2A and 2B illustrate a top view of an alignment device in and open and closed position, in accordance with one embodiment of the present invention.
Figure 2B:
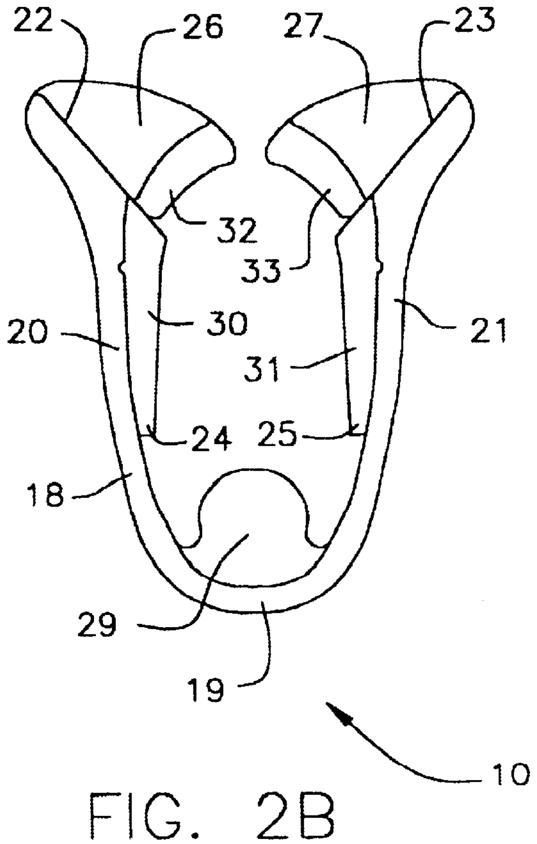

To this end, as illustrated in FIG. 1, alignment device 10 is comprised of a clip 18 having first and second resilient arms 20 and 21 which meet at a connection point 19. Clip 18 is preferably constructed of resilient plastic or polymer, however any construction material can be used provided first and second arms 20 and 21 are resilient with sufficient stiffness to maintain proper alignment and adequate inward tension to firmly secure the alignment device 10 to the punch tool 12. When set alone, as illustrated in FIG. 2A, first and second arms 20 and 21 of clip 18 are formed inward towards one another, such that when arms 20 and 21 are expanded, as illustrated in FIG. 2B, punch tool 14 is placed between the arms of clip 18, as described below. The resilient arms 20 and 21 will then press against punch tool 12 and hold alignment device 10 in place.

In one embodiment of the present invention, as illustrated in FIG. 1, clip 18 maintains first and second punch tool projections 30 and 31. Punch tool projections 30 and 31 are disposed on first and second resilient arms 20 and 21 such that they face inwardly towards each other. Projections 30 and 31 preferably extend continuously from the first and second guide edges 22 and 23 to the first and second end portions 24 and 25 however, any length useful in attaching device 10 to punch tool 12 is within the contemplation of the present invention. First and second punch tool projections 30 and 31 maintain first and second end portions 24 and 25 disposed at the end of projections 30 and 31 nearer to connection point 19 of clip 18.

Figure 3:
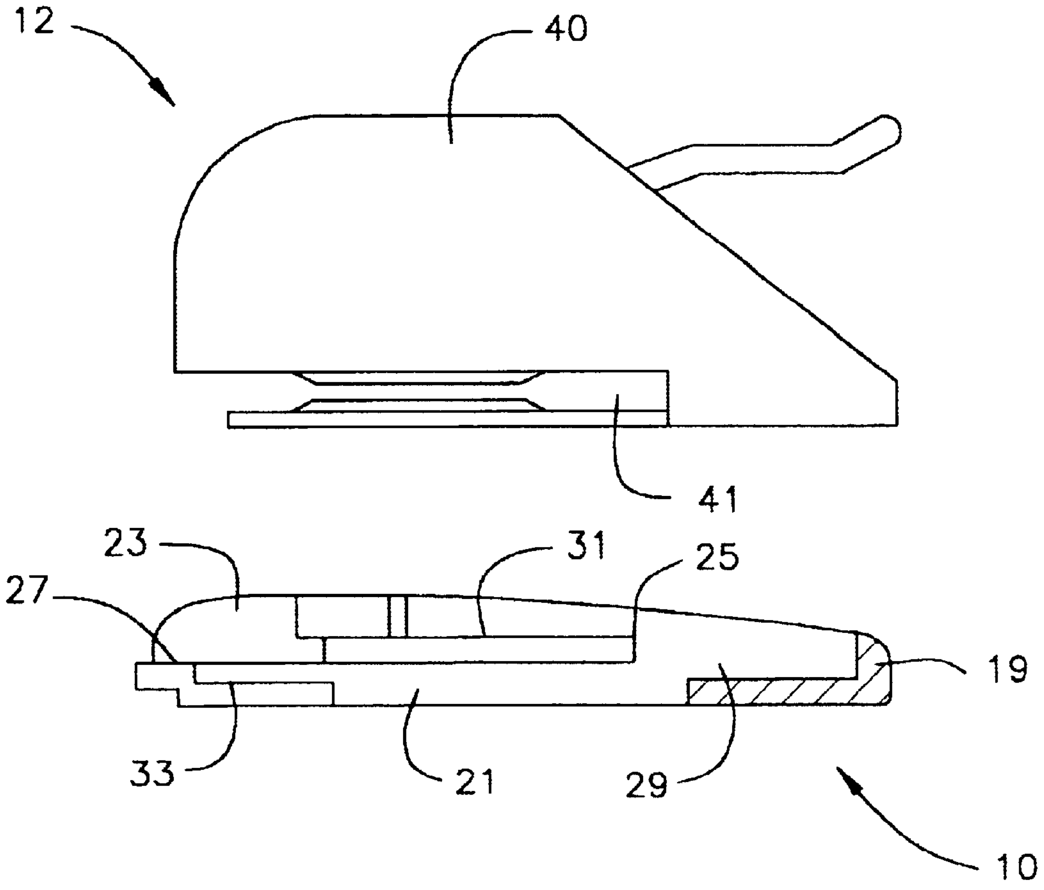
FIG. 3 illustrates a cross-sectional side elevation of an alignment device and punch tool, in accordance with one embodiment of the present invention.

In one embodiment of the present invention, as illustrated in FIG. 3, punch tool 12 maintains a punch tool body 40 and a sheet media slot 41 for receiving sheet media 14.

Figure 4:
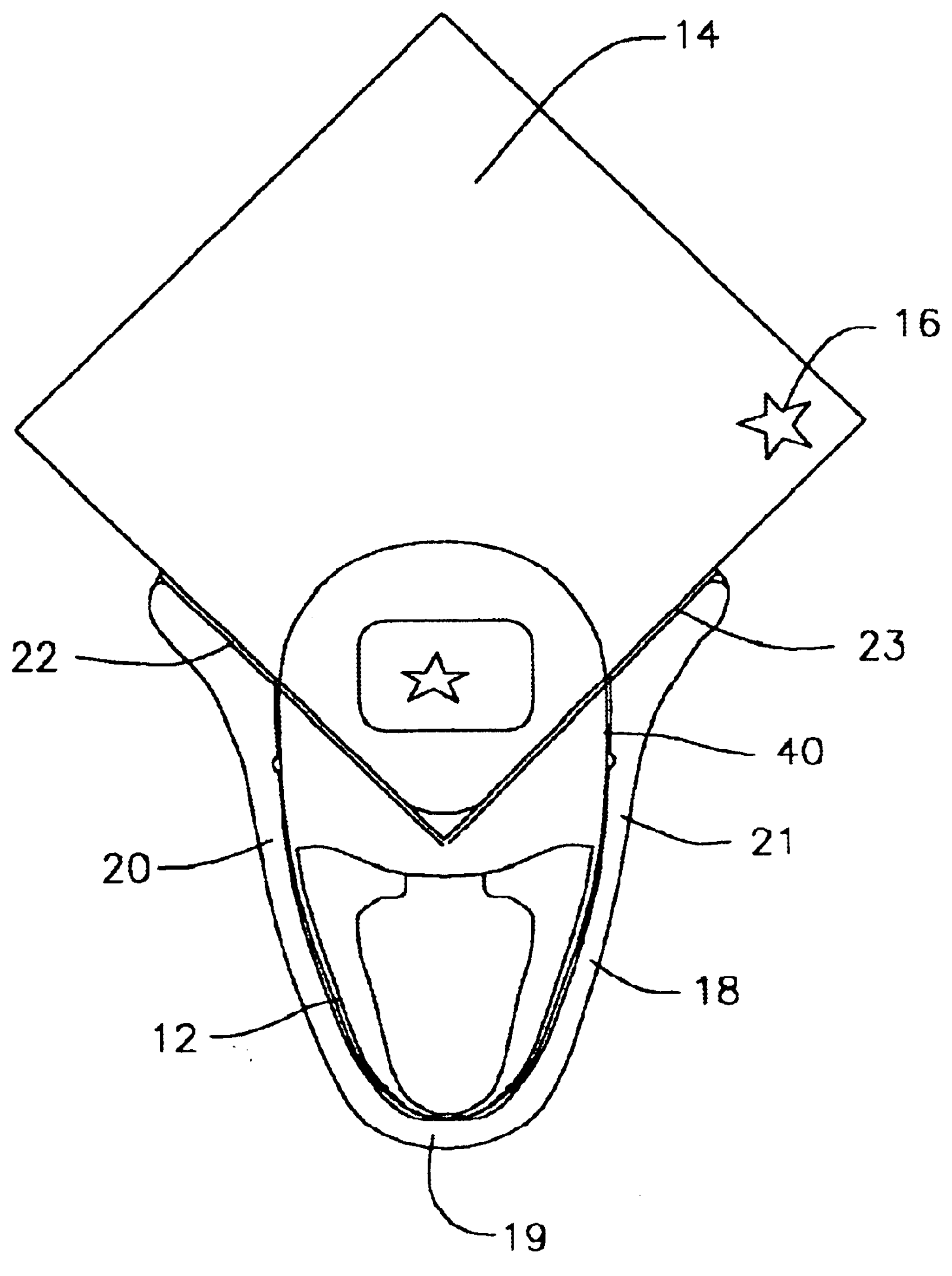
FIG. 4 illustrates a top view of an alignment device, a punch tool and a sheet media, in accordance with one embodiment of the present invention.

Preferably, as illustrated in FIG. 4, punch tool 12 maintains a design indicia 50 that corresponds to the shape of design 16 which tool 12 punches in sheet media 14.

First and second punch tool projections 30 and 31 are configured to fit into sheet media slot 41 as described in more detail below. When clip 18 is placed around punch tool 12, resilient arms 20 and 21 force first and second punch tool projections 30 and 31 into sheet media slot 41, further holding clip 18 into place. First and second endpoints 24 and 25 fit against the closed end of sheet media slot 41, further securing clip 18 to punch tool 12.

In one embodiment of the present invention as illustrated in FIGS. 1 and 3 a punch tool support 29 is disposed on clip 18 at connection point 19 facing inwardly towards first and second resilient arms 20 and 21. Punch tool support 29 supports the base of punch tool 12 so as to provide additional stability to the connection between punch tool 12 and clip 18.

In one embodiment of the present invention, as illustrated in FIG. 1, first and second guide edges 22 and 23 are disposed on the end of first and second resilient arms 20 and 21 respectively. First and second guide edges 22 and 23 are perpendicular to the plane of sheet media slot 41 of punch tool 12 so as to provide edges to align sheet media 14 with respect to punch tool 12 so that the punch will occur in a uniform manner and at a set distance from sheet media 14 corner edges.

In one embodiment of the present invention as illustrated in FIGS. 1 and 4, first and second guide edges 22 and 23 are disposed at a 90 degree angle with respect to one another such that when attached to punch tool 12, the axes of the of first and second guide edges 22 and 23 when extrapolated inwardly to meet at a right angle within sheet media slot 41. In this configuration guide edges 22 and 23 are configured to be used with standard sheet media which is square or rectangular.

It should be noted that guide edges 22 and 23 are not limited to this angle. For example, first and second guide edges 22 and 23 could be formed at an angle other than 90 degrees so as to accommodate special sheet media 14 with other shapes In addition, as illustrated in FIG. 5, guide edges 22 and 23 may be disposed at 180 degree angle such that clip 18 and punch tool 12 can be used on the side edges of sheet media 14.

In one embodiment of the present invention, as illustrated in FIG. 1, first and second guide surfaces 26 and 27 are disposed on the end of first and second resilient arms 20 and 21 and extend perpendicularly away from the base of first and second guide edges 22 and 23. First and second guide surfaces 26 and 27 are configured to provide a stable platform for sheet media 14 to be set on when it is inserted into sheet media slot 41 of punch tool 12. Preferably, first and second guide surfaces 26 and 27 are co-planar with the base of punch tool 12 inside sheet media guide slot 41 so as further assure that the punch is properly aligned on sheet media 14 and to aid in inserting sheet media 14 into the sheet media slot 41.

In one embodiment of the present invention, as illustrated in FIG. 1, each of first and second guide surfaces 26 and 27 maintain first and second depressed ridges 32 and 33 respectively. First and second depressed ridges 32 and 33 are configured to conform to the base of punch tool 12. In order to operate properly, guide surfaces 26 and 27 should be relatively co-planar with the base of punch tool 12 inside sheet media 14, however, certain punch tools 12 have irregular bases which would extend into the functional space of sheet media guide surfaces 26 and 27. As such, depressed ridges 32 and 33 are configured to conform to punch tool 12 so as to aid in securing alignment device 10 to the punch tool 12 and to accommodate the base of punch tool 12 to prevent interference with the operation and the co-planar disposition of guide surfaces 26 and 27. It should be noted that the shape of depressed ridges 32 and 33 may vary from punch tool 12 to punch tool 12 depending on the shape of the base for that particular tool. This is one example of the variations of the present invention that are possible to enable it to be used with a wide variety of punch tool 12 configurations.

Figure 5:
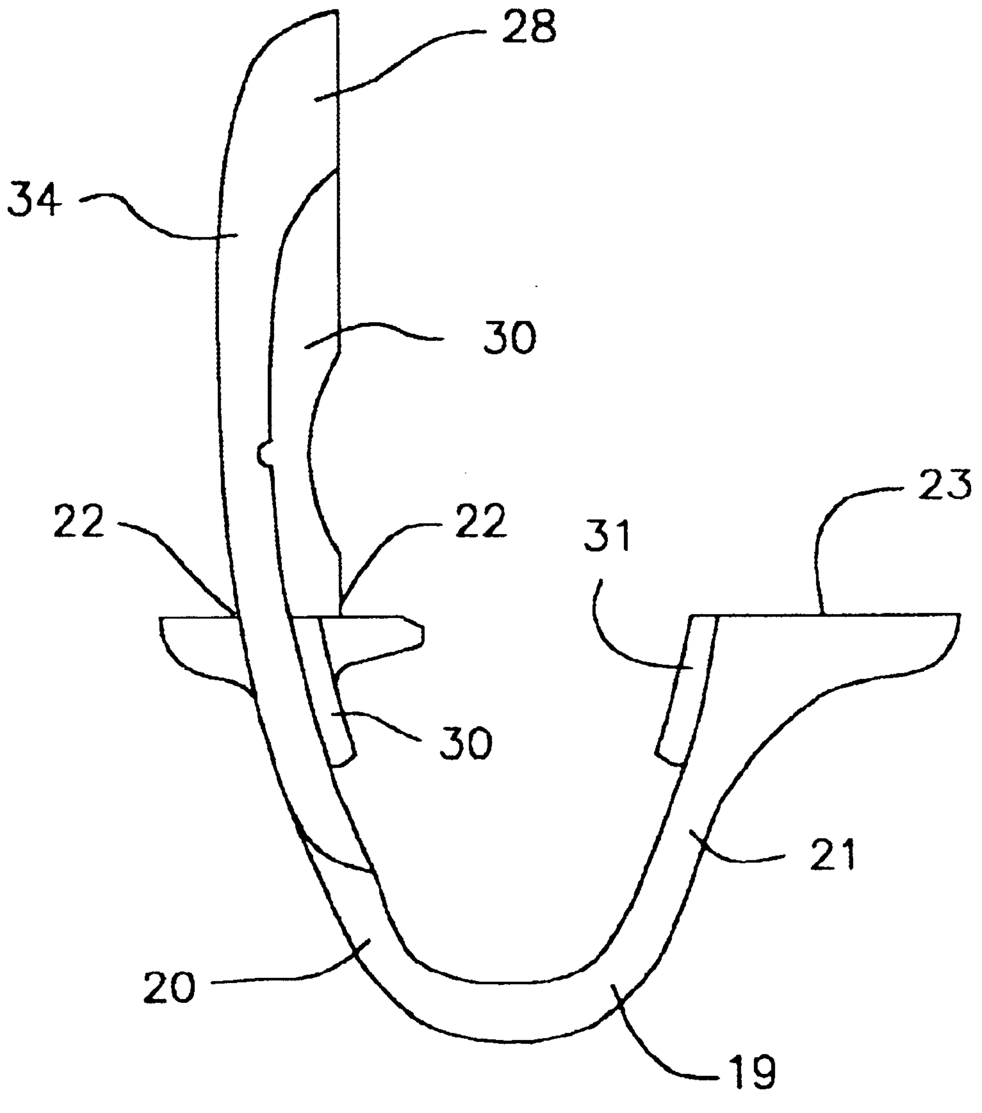
FIG. 5 illustrates a top view of an alignment device, in accordance with another embodiment of the present invention.

In one embodiment of the present invention, as illustrated in FIG. 5, a positioning guide 28 is disposed at the end of an extension arm 34. Positioning guide 28 extends beyond the end of guide edge 22 of resilient arm 20 such that when clip 18 is attached to punch tool 12 and sheet media 14 is placed against guide edges 22 and 23, positioning guide 28 extends outwardly across the surface of sheet media 14. This provides an additional means to align punch tool 12 with respect to sheet media 14 by providing a guide with which to align clip 18 and punch tool 12 with features on sheet media 14 such as an indicium, a punched hole, a scored or folded line, or an edge. For example, sheet media 14 may include some indicia disposed away from the edges which are used to set the alignment of a punched design 16, such that positioning guide 28 can be used to extend onto the surface of sheet media 14 so as to align with the indicia and position punch tool 12.

Figure 6A:
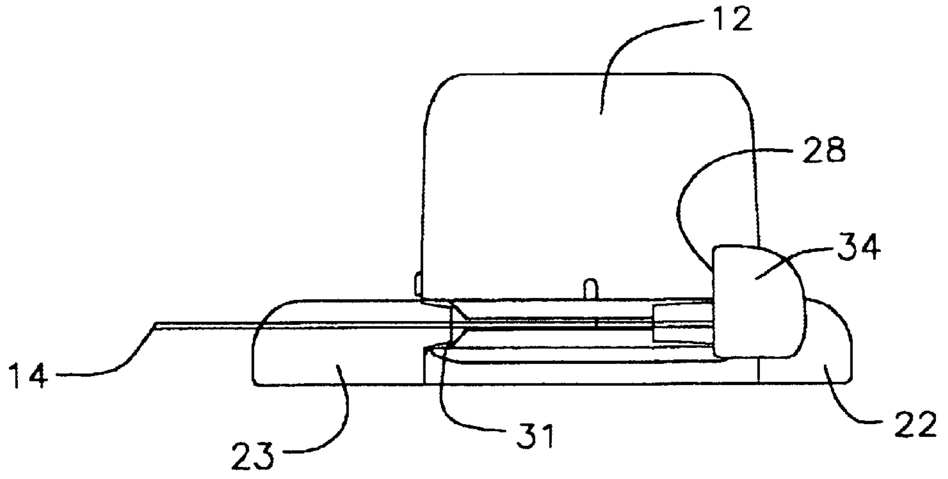
FIGS. 6*a* and 6*b* illustrate a front view of the embodiment invention shown in FIG. 5 showing it in use aligning to the edge and surface of the sheet material in accordance with one embodiment of the present invention.
Figure 6B:
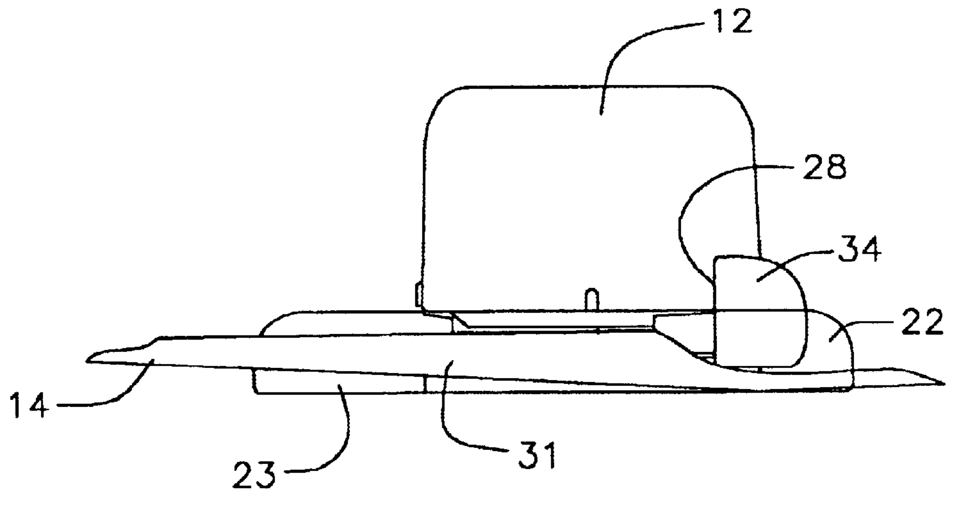

In one embodiment of the present invention extension arm 34 and positioning guide 28 are configured such that the guide edge can be used to align to the edge of the sheet media as shown in FIG. **6*a* or by positioning the sheet media underneath the additional arm 34 and positioning guide 28 can be used to align to a feature within the surface of the sheet media as shown in FIG. 6*b***.

In one embodiment of the present invention, as illustrated in FIG. 4, the present invention is configured to provide a means for uniformly aligning a sheet media 14 in a punch tool 12. When attaching clip 18 to punch tool 12, first and second resilient arms 20 and 21 are separated slightly and punch tool 12 is placed in between them. Because of the resilient nature of arms 20 and 21, when punch tool 12 is placed between first and second resilient arms 20 and 21 press against the outside body 40 of punch tool 12 holding clip 18 in place.

First and second punch tool projections 30 and 31 are fitted into sheet media receiving slot 41 with the end portions 24 and 25 fit against the closed end of sheet media slot 41, securing clip 18 to punch tool 12. Punch tool support 29 is configured to fit beneath the base of punch tool 12 to add additional stability to the connection between punch tool 12 and clip 18.

After clip 18 is securely attached to punch tool 12, a sheet media 14 is placed against first and second guide edges 22 and 23, supported by sheet media guide surfaces 26 and 27. As illustrated in FIG. 4, sheet media 14 is placed in punch tool 12 such that the corner to be punched is fitted within sheet media slot 41. In this position sheet media 14 is properly positioned within punch tool 12 such then when the punch is made, design 16 will be placed on sheet media 14 in the proper position and distance from the corner. As illustrated in FIG. 4 design 16 will match design indicia 50 from punch tool 12.

Figure 7:
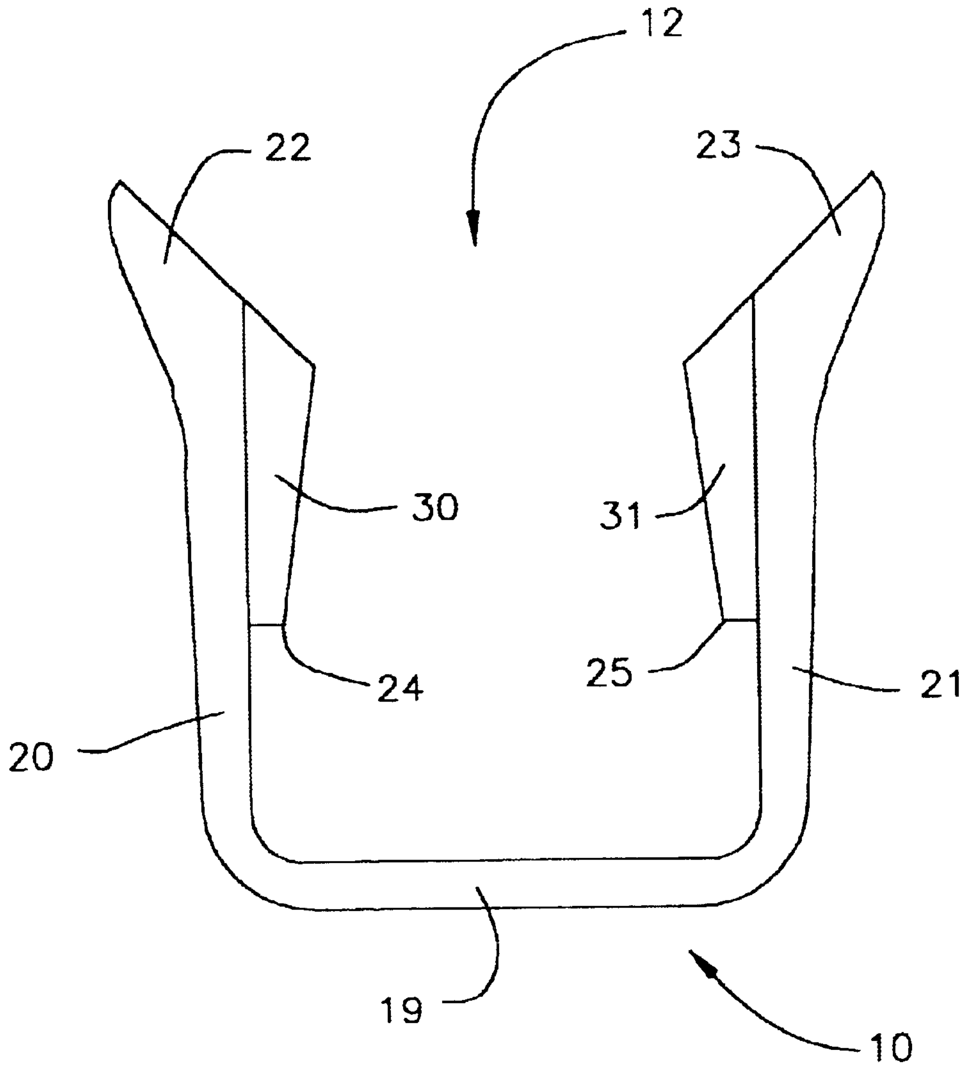
FIG. 7 illustrates a top view of an alignment device, in accordance with another embodiment of the present invention.

In another embodiment of the present invention, as illustrated in FIG. 7, the configuration of alignment device 10 is modified to work with another popular punch tool 12 design. The present invention can work with many forms of punch tool designs.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. An alignment device for aligning a punch tool having internal guides to punch a design into a specific location on a sheet media, said alignment device comprising:

a clip, said clip comprised of first and second resilient arms meeting at a connection point; and a first guide edge disposed angularly from said first resilient arm, corresponding to the internal guides of the punch tool, such that when said punch tool is secured in said clip between said first and second resilient arms and said sheet media is placed along said first guide edge, said punch tool is positioned to punch a design into the specific location on said sheet media.

2. The alignment device as claimed in claim 1, further comprising a second guide edge disposed angularly from said second resilient arm, such that when said punch tool is secured in said clip between said first and second resilient arms and said sheet media is placed along said first and second guide edges, said punch tool is positioned to punch a design into said sheet media.

3. The alignment device as claimed in claim 2, wherein said first and second guide edges define first and second axes extending parallel to first and second guide edges, said first and second axes meet at a 90 degree angle.

4. The alignment device as claimed in claim 1, wherein said punch tool maintains a sheet media slot, said alignment device further comprises a first punch tool projection disposed on said first resilient arm such that when said punch tool is fit into said clip between said first and second resilient arms, said first punch tool projection fits into said punch tool media slot.

5. The alignment device as claimed in claim 4, where is said punch tool maintains a sheet media slot, said alignment device further comprises first and second punch tool projections disposed on said first and second resilient arms such that when said punch tool is fit into said clip between said first and second resilient arms, said first and second punch tool projections fits into said punch tool media slot.

6. The alignment device as claimed in claim 1, further comprises a first guide surfaces disposed at the end of said first resilient arm, configure to support said sheet media when placed into said punch tool.

7. The alignment device as claimed in claim 6, further comprises a first and second guide surfaces disposed at the end of said first and second resilient arms, configure to support said sheet media when placed into said punch tool.

8. The alignment device as claimed in claim 1, wherein said clip further comprises a punch tool tab that extends from said clip so as to provide additional stability when said punch tool is fitted into said clip.

9. The alignment device as claimed in claim 1, wherein said clip and said first and second resilient arms is U-shaped.

10. The alignment device as claimed in claim 1, wherein said clip and said first and second resilient arms are constructed of resilient plastic.

11. The alignment device as claimed in claim 1, wherein said clip and said first and second resilient arms are constructed of a polymer.

12. An alignment device for aligning a punch tool to punch a design into a sheet media, said alignment device comprising:

a clip, said clip comprised of first and second resilient arms meeting at a connection point;

a first guide edge disposed angularly from said first resilient arm, such that when said punch tool is secured in said clip between said first and second resilient arms and said sheet media is placed along said first guide edge, said punch tool is positioned to punch a design into said sheet media, a second guide edge positioning guide for aligning the punch tool relative to a feature on the sheet media, said second guide edge position guide, disposed at the end of said first resilient arm, is configured such that said positioning guide can be used to align said punch tool relative to an edge of said sheet media by positioning the sheet media under the arm and positioning guide, aligning the punch tool relative to a feature within the surface area of the sheet media.

13. The alignment device as claimed in claim 12, further comprising a second guide edge disposed angularly from said second resilient arm, such that when said punch tool is secured in said clip between said first and second resilient arms and said sheet media is placed along said first and second guide edges, said punch tool is positioned to punch a design into said sheet media.

14. The alignment device as claimed in claim 13, wherein said first and second guide edges define first and second axes extending parallel to first and second guide edges, said first and second axes meet at a 90 degree angle.

15. The alignment device as claimed in claim 12, wherein said punch tool maintains a sheet media slot, said alignment device further comprises a first punch tool projection disposed on said first resilient arm such that when said punch tool is fit into said clip between said first and second resilient arms, said first punch tool projection fits into said punch tool media slot.

16. The alignment device as claimed in claim 15, where is said punch tool maintains a sheet media slot, said alignment device further comprises first and second punch tool projections disposed on said first and second resilient arms such that when said punch tool is fit into said clip between said first and second resilient arms, said first and second punch tool projections fits into said punch tool media slot.

17. The alignment device as claimed in claim 12, further comprises a first guide surfaces disposed at the end of said first resilient arm, configure to support said sheet media when placed into said punch tool.

18. The alignment device as claimed in claim 17, further comprises a first and second guide surfaces disposed at the end of said first and second resilient arms, configure to support said sheet media when placed into said punch tool.

19. The alignment device as claimed in claim 12, wherein said clip further comprises a punch tool tab that extends from said clip so as to provide additional stability when said punch tool is fitted into said clip.

20. The alignment device as claimed in claim 12, wherein said clip and said first and second resilient arms is U-shaped.

21. The alignment device as claimed in claim 12, wherein said clip and said first and second resilient arms are constructed of resilient plastic.

22. The alignment device as claimed in claim 12, wherein said clip and said first and second resilient arms are constructed of a polymer.

* * * * *